United States Patent Office 3,480,565
Patented Nov. 25, 1969

3,480,565
NAPHTHALENE AND ORTHOXYLENE
OXIDATION CATALYSTS
Rodney A. Adams, Louisville, Ky., assignor to Catalysts and Chemicals, Inc., a corporation of Delaware
No Drawing. Filed Aug. 4, 1967, Ser. No. 658,338
Int. Cl. B01j 11/82
U.S. Cl. 252—443　　　　　　　　　　　　　　6 Claims

ABSTRACT OF THE DISCLOSURE

Phthalic anhydride is almost entirely produced by the direct air oxidation of either naphthalene or orthoxylene. A vanadium pentoxide type catalyst especially suitable for the oxidation of orthoxylene is prepared herein containing vanadium pentoxide, chromic oxide and vanadyl sulfate prior to calcination.

BACKGROUND OF THE INVENTION

The rapid growth of polyesters and other resins made from phthalic anhydride has been responsible for a wide spread demand for phthalic anhydride. Commercially phthalic anhydride is almost entirely produced by the direct air oxidation of either naphthalene or orthoxylene. Orthoxylene, however, being somewhat more desirable as a feed, has now come into wide use. A lower heat of reaction and fewer purification difficulties have led to this use.

The oxidation of orthoxylene is highly exothermic, and care must be taken to prevent overheating the catalyst, particularly since there is also a possibility of explosion and fire. To avoid operating in the explosive range, about ten times the theoretical quantity of air is used. The usual quantities employed are a weight ratio of air to orthoxylene in the range to 16:1 to 35:1 and even higher, and 10:1 to 30:1 when naphthalene is oxidized. As in the case of naphthalene, orthoxylene and air are passed over a suitable catalyst, most frequently vanadium pentoxide, at a temperature in the range of 750° F. to 1450° F. The oxidation process is carried out using space velocities in the range of 500 to 10,000 volumes of gas per volume of catalyst per hour depending upon whether the operation is fixed or fluidized bed, at least 1000 being employed if fluidized bed operation is employed.

After being mixed, the air and xylene pass down through a converter which is generally a tubular, heat exchange type reactor with the catalyst inside the tubes and a coolant such as a molten salt on the outside. The reaction product gases from the converter are cooled in individual heat exchangers and then passed to condensers where the phthalic anhydride sublimes out of the stream as long, white, needle-like crystals which adhere to condenser surfaces.

Whereas the selective oxidation of orthoxylene appears to be more desirable than the oxidation of napthalene because of a lower heat of reaction and easier purification, the process is much more difficult to carry out on a commercial scale. In addition to the danger of overoxidation to maleic anhydride or carbon dioxide and water, it is difficult commercially and apart from pilot plant operation, to maintain reaction conditions to obtain consistently high yields. A catalyst is not available leading consistently to yields commercially of over 90 percent, particularly yields approaching 95 to 99 percent in the case of orthoxylene. Thus, 3,129,230 which disclosed the oxidation of orthoxylene using a vanadium oxide catalyst (15 parts of vanadium oxide supported on 85 parts silicon carbide) reports yields amounting to 99 percent based on orthoxylene feed. However, a residence time of 0.001 to 0.05 second followed by rapid cooling is used. It is pointed out that data indicate that appreciably longer or shorter residence times result in inferior yields of phthalic anhydride. Such a process would, therefore, be difficult to carry out on a commercial basis.

SUMMARY OF THE INVENTION

In accordance with the practice of this invention a catalyst is provided which is eminently suitable for use in the commercial process for the preparation of phthalic anhydride by the oxidation of orthoxylene. The invention contemplates the use of chromium, titanium or zinc, in the form of heat decomposible salts, as adjuvants, employed in combination with vanadium pentoxide. These two catalytic ingredients are applied in dry form to the carrier using an aqueous vanadyl sulfate solution as a binder.

DETAILED DESCRIPTION OF THE INVENTION

There are two aspects of this invention. One relates to improving the activity of the catalyst. The other is directed to improving the durability of the catalyst. In addition whereas the catalyst is intended primarily for use in the case of orthoxylene, it also functions as a naphthalene oxidation catalyst.

Directing our attention first to activity, a vast amount of work has been conducted on the oxidation of orthoxylene. Nevertheless, the presence of the vanadium in the catalyst still appears quite necessary. This invention, is, therefore, directed to improving vanadium catalysts.

In the production of phthalic anhydride by the oxidation of orthoxylene using vanadium catalysts, various promoters have been tried. U.S. 2,424,398, for example, suggests the addition of molybdenum, tungsten, chromium, uranium, copper, cobalt, magnesium and other promoters in a range of 5 to 30 percent of the catalyst. U.S. 3,167,567 discloses mixtures of molybdenum and tungsten. Nevertheless, it appears that the advisability of using promoters is not well settled. Thus in an article appearing in I. & E. C., December, 1958, at page 1719, it is reported that the addition of molybdenum oxide to vanadium pentoxide did not improve the yield of phthalic anhydride. A catalyst containing cobalt oxide was more degradative in action than the unpromoted catalyst. The use of uranium oxide with vanadium pentoxide resulted in a heat sensitive catalyst. It is apparent, therefore, that the advantage of using promoters is not completely established. In many instances too much maleic anhydride is produced.

In accordance with the practice of this invention a marked improvement in phthalic anhydride yield is obtained by the use of chromium as an adjuvant, and to a lesser extent, titanium and zinc, if certain criteria are satisfied. First, contrary to the prior art a very small quantity is employed, for instance less than 1 percent, and usually 0.1 to 0.75, preferably 0.25 to 0.5, percent as metal, based on the finished catalyst. We believe this amount enables the adjuvant more readily to enter the crystal lattice with little or no excess beyond that so entering. Without being bound by any theory, vanadium pentoxide compositions which are active in oxidizing orthoxylene to phthalic anhydride appear to be stable lattice structures of $V_2O_5$ and $V_2O_{4.34}$. It is postulated that oxygen ions interact directly with the orthoxylene and that the catalyst acts as a transfer medium, converting an oxygen molecule striking the catalyst surface to an oxygen ion. Orthoxylene is known to donate an electron to the surface, forming a positive chemisorbed ion. Under these circumstances the uptake of oxygen by the catalyst is controlled by impurity centers or structural defects in the vanadium pentoxide lattice.

The chromium, titanium, and zinc as used herein thus are not promoters in the ordinary sense. They are adjuvants used only in such small amounts that defects in the vanadium-oxygen lattice are produced. The modification of the lattice enhances the electron transfer from orthoxylene to the surface, allowing oxidation to take place more readily. Chromium, titanium and zinc were selected on the basis of the ionic radii and valences. Thus, a vanadium pentoxide catalyst containing bismuth with an ionic radius above 0.7 A. and a valence of +5, is not as good as the catalyst without any bismuth, which tends to explain the results discussed in the December 1958, I. & E.C. According to this invention the promoting metals have positive valences less than +6, and their ionic radii are such that they readily enter the vanadium oxide lattice structure. As an example, chromium has an ionic radium of 0.55 A. which is smaller than titanium and zinc. This is reflected in the superior activity of the chromium catalyst compared to titanium and zinc.

In another embodiment, to further insure that the adjuvant metals enter the vanadium-oxygen lattice, they are preferably calcined together prior to their application to the carrier. Thus whether the vanadium pentoxide-chromic oxide blend is made by heat decomposing dried solid salts of vanadium and chromium or by dry blending vanadium pentoxide and chromic oxide, the combination is best calcined at a temperature of 800° F. to 1200° F. to first produce the chromium-modified vanadium pentoxide lattice. The resulting pulverized catalytic vanadium pentoxide having a chromium modified lattice, is then applied to a carrier. In addition, to insure intimate contact of the vanadium and chromium oxides it is preferred to add the chromic oxide, or a water soluble salt of chromium, to an aqueous vanadium salt solution, say vanadyl oxalate. The solution is then evaporated, dried and heated to form an intimate mixture of oxides to be put on the carrier. The vanadyl oxalate solution when used is made by reacting oxalic acid with ammonium vanadate in a ratio of 1.75 to 2.25 mols, oxalic acid to 1 mol ammonium vanadate. Preferably stoichiometric quantities are employed. Sufficient water is used to form a fifteen to twenty-five percent solution as $V_2O_5$. The temperature employed is not critical, ranging from ambient to about 200° F. When the reaction is complete the $CrO_3$ is added, and the solution spray dried.

Carriers for vanadium pentoxide are well known for this oxidation reaction, and these carriers are contemplated herein. The commonly employed carriers are inert materials, resistant to fusion by heat, and to abrasion such as corundum particles, silica gel, pumice, kieselguhr, diatomaceous stones and zeolites. Preferred carriers are silicon carbide, fused alumina and alundum.

The other aspect of this invention concerns the application of the catalyst materials to the carrier. Catalyst materials have been applied to carriers by various methods. However they are applied herein in dry, powdered, form. The dry catalyst materials could be applied to the fused carrier by first wetting the hard carrier surface. However, using this method of application adherence, and attrition, become factors. An aspect of this invention contemplates the use of a unique binder, which has been found not only to improve adherence of the catalyst material to the carrier, but which also adds significantly to the activity of the catalyst. In addition an unexpected increase in the effectiveness of the catalyst occurs in the form of further increased yields and durability. According to this aspect, an aqueous solution of vanadyl sulfate has been found to be an unusual binder. The resulting catalyst not only has a longer life, but the vanadium in the vanadyl sulfate appears to have a synergistic effect as shown by the activity of the finished catalyst. A new composition of matter is obviously formed by the process. However, it is undefinable because it is not known what form the vanadium in the vanadyl sulfate assumes on calcination.

Thus in preparing the catalyst by the practice of this aspect of the invention the carrier is moistened or wetted with five to fifteen weight percent, preferably eight percent, based on the carrier, of the binder solution which contains sufficient vanadyl sulfate so that the carrier contains 0.10 to 2 percent vanadium as vanadyl sulfate. To the wetted carrier, either in a ball mill, cylinder, or other mixer, the dry calcined or uncalcined $V_2O_5$–$CrO_3$ mix is slowly added to obtain a catalyst containing 5 to 15 percent $V_2O_5$ and 0.1 to 0.75 percent $CrO_3$ as chromium based on the finished catalyst, the finished catalyst being obtained by drying the composition and calcining the dried composition at a temperature in the range of 800° F. to 1200° F. Obviously the ratio of $V_2O_5$ is $CrO_3$ in the dry mix is such that the finished catalyst contains the appropriate percentages of $V_2O_5$ and $CrO_3$. This is a weight ratio of 15 to 100 parts $V_2O_5$ to 1 part chromium, as $CrO_3$.

It has been found that somewhat better results are obtained if the vanadyl sulfate solution is prepared in situ from ammonium sulfite and ammonium vanadate. The two are reacted at ambient temperature to 200° F. in a mol ratio of .75 to 1.25 mols ammonium sulfite to 1 mol ammonium vanadate; desirably twice the stoichiometric amount is used. Sufficient water is normally employed to form a 5 to 15 percent solution calculated as $V_2O_5$.

The various aspects of this invention will now be illustrated through the use of specific examples and comparative data, one of the preferred methods of making the catalyst by means of the binder being first exemplified.

EXAMPLE 1

Part I.—Binder solution preparation

Ammonium metavanadate, 170 parts by weight, is added to 400 parts of water in a container equipped with a stirrer and heating. To this slurry is added 195 parts ammonium sulfite in 400 parts of water. Over a period of five hours, 370 parts of approximately 65 percent sulfuric acid is added to produce a bright blue vanadyl sulfate solution. The maximum temperature used during the reaction is about 200° F. This solution is approximately 10 percent $V_2O_5$ by weight, the pH being about 3.0±1.

Part II.—Vanadyl oxalate preparation

To 7000 parts by weight water, slightly heated, in a container equipped with a stirrer, are added 5440 parts oxalic acid crystals. To this slurry 2700 parts ammonium metavanadate are added over a period of about one hour, the addition being limited by the foaming as $CO_2$ is released during the reaction, reducing the vandium to the +4 state. After all of the ammonium metavanadate is reacted, a solution of 219 parts $CrO_3$ in about 500 parts of water is added. Maximum temperature during the reaction is under about 200° F. This dark blue solution, containing approximately 8.9 percent vanadium is first spray dried then calcined at 400° F. Temperature is incrementally increased to a final calcination temperature of about 1000° F.

Part III.—Carrier impregnation

To a rotating drum 118 parts by weight of silicon carbide carrier are charged. Onto the carrier are sprayed 9.5 parts of a vanadyl sulfate binder solution over a period of about 15 minutes. After the carrier is evenly wetted, the powdered catalytic material, 14.7 parts, is added over a period of about 15 to 30 minutes in such a manner that all of the carrier is evenly coated with the catalytic material. Rotation of the drum is continued for a period of up to about 4 hours so that the catalytic material is compacted onto the carrier surface. The coated carrier is then calcined starting at about 400° F., up to a maximum temperature of about 1050° F. This calcined catalyst has a low attrition loss. It contains 9.5 percent $V_2O_5$ and 0.5 percent Cr (as $CRO_3$) on the finished catalyst.

To compare other methods of applying the dry mix of vanadium and chromic oxides to the carrier the following are given.

EXAMPLE 2

Following Part III of Example 1, 1200 parts by weight of a silicon carbide carrier were wetted, but water was used in lieu of the vanadyl sulfate solution, 680 parts of water being employed. As in Example 1 155 parts by weight of the mixture of oxides were added over a period of about one half hour. The material was then rolled for an additional two hours. The catalyst contained 9.5 percent $V_2O_5$ and 0.5 percent Cr, as $CrO_3$. It was calcined at 1012° F.

EXAMPLE 3

Following the procedure of Example 2 the vanadium and chromium oxides were applied to the carrier using as the wetting or binding solution an aqueous sulfuric acid solution made by the addition of 160 volumes of water to 1 volume of concentrated sulfuric acid. This catalyst also contained 9.5 percent $V_2O_5$ and 0.5 percent Cr, as $CrO_3$. It was calcined at 990° F.

EXAMPLE 4

Following the procedure of Example 2 another catalyst was made, in this instance being as the binder an aqueous ammonium sulfite solution made by the addition of 900 mililiters of water to 12.6 grams $(NH_4)_2SO_3 \cdot H_2O$. This catalyst also contained 9.5 percent $V_2O_5$ and 0.5 percent Cr as $CrO_3$. It was calcined at 990° F.

A comparison of the various methods of bonding catalyst ingredients, the dry mixture of metal oxides, to the carrier is given in Table 1, orthoxylene being converted to phthalic anhydride. The data recorded in this and the other tables herein was obtained from a pilot plant reactor which contained three commercial size tubes approximately 6½ feet in length and 1 inch inside diameter, and was surrounded by a flowing molten salt bath to regulate temperatures exactly as modern commercial plants operate. The apparatus differed from commerical reactors only in the number of tubes in the bundle. A gas stream containing 95 percent o-xylene was charged to each tube at a rate based on orthoxylene of 5.5 ml. per minute, along with 3.57 s.c.f. of air to give a reaction gas mixture containing approximately 1.0 mol percent o-xylene. The temperature was 800° F., heat being supplied by molten salt. The data are averages of test made.

TABLE 1

| Catalyst | Initial Yield | Yield at End of Test |
|---|---|---|
| Example 1 | 96 | 94 at end of 3 months. |
| Example 2 | 86 | 78 at end of 3 days. |
| Example 3 | 92 | Do. |
| Example 4 | 85 | 74 at end of 3 days. |

As shown by the data in the last column, the $VOSO_4$ used as a binder apparently contributes to the formation of some type permanent bond. It can be seen that the yield was still 94 percent at the end of the run whereas the other catalysts were unsatisfactory in less than three days. Yields below 85 percent are considered unsatisfactory. In addition as can be seen from the initial yield column an improvement in activity results from the use of the binder of this invention. Only the binder was changed in the examples.

Besides the use of the vanadyl sulfate binding solution to confer durability characteristics of the catalyst, another criterion is the use of only a small quantity of the adjuvant. This is best illustrated by the following examples.

EXAMPLE 5

A catalyst prepared according to the process of Example 1 except that the oxalate was not used. 158.8 parts by weight of powdered $V_2O_5$ were dry mixed with 7.19 parts by weight $CrO_3$. This catalyst contained 9.5 percent $V_2O_5$ and 0.5 percent chromium as $CrO_3$.

EXAMPLE 6

A catalyst was prepared according to Example 5 except that 28.7 parts by weight of $CrO_3$ were mixed with 146.6 parts by weight of $V_2O_5$ resulting in a catalyst which contained 1.0 percent Cr as $CrO_3$ and 9 percent $V_2O_5$.

EXAMPLE 7

Another catalyst was prepared according to Example 1 containing 9.5 percent $V_2O_5$ and 0.5 percent Cr.

EXAMPLE 8

To 7000 parts by weight of water in a container equipped with heating and stirring means 5440 parts oxalic acid were added. Following Example 1, Part III, 2,700 parts ammonium metavanadate were added over a one hour period. After all of the ammonium metavanadate had reacted a solution of 449 parts by weight chromic acid in 800 parts were added. This solution was spray dried and the composition was then calcined at 1000° F. The resulting catalyst contained 1 percent Cr as $CrO_3$, and 9 percent $V_2O_5$.

In Table 2 can be seen a comparison of the 1 percent chromium composition with those containing less than 1 percent as contemplated by this invention.

TABLE 2

| Catalyst | Percent Cr | Percent Yield |
|---|---|---|
| Example 5 | 0.5 | 89.6 |
| Example 6 | 1 | 79.4 |
| Example 7 | 0.5 | 94 |
| Example 8 | 1 | 78.8 |

As indicated in the specification various methods of insuring entry of chromium into the $V_2O_5$ lattice can be employed. For example the dry mixture of the $V_2O_5$ and $CrO_3$ can be used, by calcining after application to the carrier as in Example 5, or this intimate mixture additionally can be calcined prior to application to the carrier. Yields where the catalyst is calcined only after application to the carrier averaged 87 percent for six runs. Prior calcination more effectively incorporates the chromium into the $V_2O_5$ lattice. Thus a dry mix of $V_2O_5$ and $CrO_3$ was calcined at 934° F., applied to the wetted carrier, and calcined again. The average yield in this instance was 90%. An even more intimate combination of the $CrO_3$ with $V_2O_5$ is obtained by the oxalate method. Oxalic acid is dissolved in water and ammonium vanadate is added to form a 20 percent solution as $V_2O_5$, the vanadium to oxalate weight ratio being 1:2. To this solution $CrO_3$ in weight ratio of 10.6 V to 1 Cr is added. The material is spray dried and calcined at 1000° F. The calcination temperature in all instances should be 800° F. to 1200° F. for best results. This is the process of Example 1, and the average yields in the oxidation of orthoxylene were 95 to 99 percent, and yields in the oxidation of naphthlene averaged 92 percent.

Referring now to adjuvants, it has been pointed out that the ionic radius of chromium lends itself most readily to incorporation in the vanadium oxide lattice. This is best illustrated by the following table.

TABLE 3

| Run | Adjuvant | Mol Percent $CO_2$ | Mol Percent CO | PAA Yield, lb./hr. | Yield Percent PAA |
|---|---|---|---|---|---|
| 35 | 0.5% Cr | 28.7 | 10.1 | .608 | 95.3 |
| 42 | 0.5% Ti | 29.1 | 11.1 | .557 | 87.3 |
| 40 | 0.5% Zn | 27.4 | 10.9 | .558 | 87.4 |
| 34 | 0.5% Mo | 24.0 | 10.5 | .507 | 80.2 |
| 38 | 0.5% Cu | 33.2 | 12.5 | .496 | 77.7 |
| 31 | 0.5% Bi | 30.1 | 12.6 |  | 73.9 |
| 36 | 0.5% Mn | 37.0 | 15.0 | .580 | 69.0 |
| 30 | 0.5% W | 31.1 | 10.6 | .510 | 80.7 |

As can be seen from Table 3, even when less than one percent is used based on the catalyst, only the adjuvants of this invention give phthalic anhydride yields above the desired 85 percent. This appears to be due to the sizes of their atomic radii.

This invention thus provides an outstanding new, durable and efficient catalyst for the oxidation of orthoxylene and naphthalene. So long as the dry oxides and the vanadyl sulfate binder are employed several methods of making the catalysts are available. In addition a wide latitude of ingredients is permissible. These and various modifications will be obvious to those skilled in the art. Such ramifications are deemed to be within the scope of this invention.

What is claimed is:

1. A process for the preparation of a catalyst for the oxidation of naphthalene and orthoxylene to form phthalic anhydride, which comprises moistening a carrier with 5 to 15 percent based on the carrier of an aqueous vanadyl sulfate binder solution of such concentration that the carrier contains 0.10 to 1.0 percent vanadium, distributing in dry form on said moistened carrier, to be bound to said carrier by the vanadyl sulfate solution, an intimate, pulverized, dry mix of vanadium pentoxide, and an adjuvant selected from the group consisting of chromium, titanium and zinc oxides, the ratio of vanadium pentoxide to adjuvant being 15 to 100 parts by weight vanadium pentoxide to 1 part adjuvant as the oxide, the amount within said range being such that the finished catalyst contains 5 to 15 weight percent vanadium pentoxide, and 0.1 to 0.75 weight percent as metal of the adjuvant, drying the composition and calcining the dried composition.

2. The process of claim 1 wherein the dry mix is a mixture of vanadium pentoxide and chromic oxide, and wherein the carrier is selected from the group consisting of silicon carbide, fused alumina and alundum.

3. The process of claim 2 wherein the dry mix is calcined at 800° F. to 1200° F. prior to being added to the moistened carrier.

4. The process of claim 3 wherein the vanadyl sulfate is prepared by the reaction of ammonium sulfite, ammonium vanadate and sulfuric acid.

5. The process of claim 3 wherein the vanadium pentoxide-chromic oxide mix is made from a solution of vanadyl oxalate containing chromic oxide, by eliminating the water therefrom and heat decomposing the vanadyl oxalate.

6. The composition resulting from the process of claim 5.

References Cited

UNITED STATES PATENTS

| | | | |
|---|---|---|---|
| 3,288,724 | 11/1966 | Russell et al. | 252—443 |
| 2,698,306 | 12/1954 | Matejczyk | 252—464 |
| 3,000,908 | 9/1961 | Ruthruff | 260—346.4 |

DANIEL E. WYMAN, Primary Examiner

P. M. FRENCH, Assistant Examiner

U.S. Cl. X.R.

252—440, 464; 260—346.3